(No Model.)
G. ETTY.
CARD TOOTH.
No. 260,466. Patented July 4, 1882.
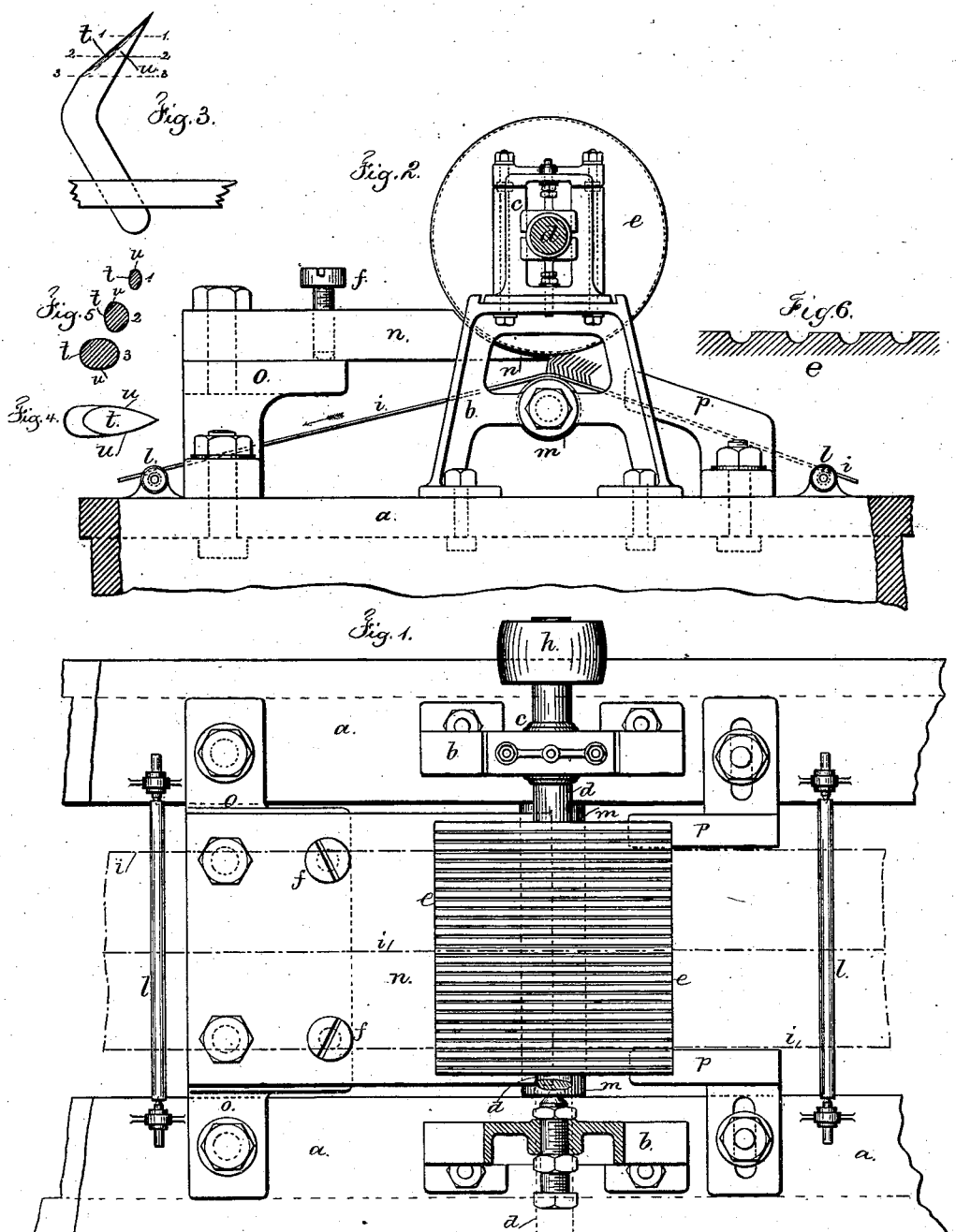

UNITED STATES PATENT OFFICE.

GEORGE ETTY, OF MANCHESTER, ENGLAND, ASSIGNOR TO WILHELM DECKER, OF MITTWEIDA, SAXONY.

CARD-TOOTH.

SPECIFICATION forming part of Letters Patent No. 260,466, dated July 4, 1882.

Application filed January 31, 1881. (No model.) Patented in England November 13, 1880, No. 4,682; in Germany December 25, 1880, No. 14,509; in France January 3, 1881, No. 140,466; in Belgium January 5, 1881, No. 53,503; in Austria-Hungary, by privilegium, No. 2,132, and in Italy March 31, 1881, XXV, 225.

*To all whom it may concern:*

Be it known that I, GEORGE ETTY, of Manchester, Great Britain, have invented an Improvement in Card-Teeth, of which the following is a specification.

Cards for combing wool and other fibrous materials have heretofore been made with teeth the ends of which had been ground off in a plane parallel, or nearly so, with the surface of the leather in which the teeth are secured, to form surfaces with sharp edges; and to produce teeth with taper or pointed ends the wire, previous to being cut into lengths, has had portions removed at regular intervals and the wire afterwards cut at the center of the places where the metal had been reduced, so that each length of wire had two tapering ends. These ends, however, were not sharp or needle-pointed.

My improved card-tooth is sharp and needle-pointed, and the tapering portion of the tooth is of double-convex form cross-sectionally at any place between the point and the place where the taper commences.

In order to manufacture my improved form of tooth, it is necessary to grind the teeth after they have been inserted in the leather, and in order to produce the double-convex form upon the card-teeth as the card-clothing passes along in contact with the grinder it is necessary to spring the teeth down and allow the grinder to point the teeth. To accomplish this grinding operation I find it preferable to employ the machine herein illustrated. I will describe this machine and the method pursued in grinding the teeth in order that the shape of the teeth may be more fully understood.

In the drawings, Figure 1 is a plan, partly in section, of the machine for pointing the teeth of cards; and Fig. 2 is an end view of the same. Fig. 3 is a side view, and Fig. 4 a plan view, of one of the teeth in enlarged size. Fig. 5 represents cross-sections of the tooth at the lines 1 1, 2 2, and 3 3. Fig. 6 is a section in larger size of the grooved surface of the grinding-cylinder.

$a$ is the base of the machine, and upon this, and bolted to it, are the frames $b$, that support the bearings for the shaft $d$ of the grinding-wheel $e$, and the boxes $c$ $c$ are adjustable, so that the shaft and its wheel can be raised or lowered to bring the grinding-wheel to its proper position in relation to the card-teeth that are moved along beneath it. This wheel $e$ is preferably of emery, and its surface is grooved circumferentially in lines that are the same distance apart as the lines of teeth in the card. It is revolved rapidly by a belt to the pulley $h$, and is reciprocated slightly in the direction of its axis by any desired means—such as a lever with forked ends taking a groove in a collar upon the shaft $d$, as illustrated by dotted lines at $d^2$ in Fig. 1; or this end motion may be given by a crank or cam. Each groove is semicircular, or nearly so.

The ordinary card, formed of wires inserted in the leather $i$ and bent to the proper shape, is drawn through the machine under suitable tension, and passes over the rollers $l$ $l$ and $m$ and between the adjustable guides $p$ $p$, which latter keep the strip in its proper position, so that the lines of teeth will be in line with the grooves in the grinding-wheel $e$; and I remark that it is preferred to have the wheel $e$ of such length as to operate upon two cards at one time, the two cards being side by side, as shown by dotted lines in Fig. 1. The roller $m$ is below the lowest part of the wheel $e$, and the distance between the two is less than the height of the card-teeth.

Between the roller $m$ and the grinding-wheel is the stationary guard $n$, that is supported by the cross-piece $o$, and said guard is wider than the strip or strips of card-clothing, and its forward part is made as a thin edge or blade, that is above the bend in the teeth. As the cards are drawn forward in the direction of the arrow, Fig. 2, this presser acts upon the upper part of the teeth and springs their ends into an inclined position to the surface of the wheel $e$, and preferably at such an angle that about two-thirds of each tooth above the bend is in position to be acted upon by the grinding-wheel.

It is to be understood that the wire teeth are not bent by the guard or shield $n$, but simply sprung, and they rest against and are steadied by the guard n and drawn down beneath the same as the card-clothing is moved along and the teeth change their angle to the grinding-surface, so that the combined revolving and reciprocating grinding-wheel e produces on each tooth the taper t and u u, as shown in Figs. 3 and 4, similar to a needle-point, and the length of the tapering portion t will be varied by raising or lowering the guard n by the set-screws f. The grooved grinding-wheel does not shorten the length of the card-teeth, but it simply tapers and rounds the point.

The advantages of these needle-pointed teeth are that in the preparation of fibrous materials the needle-points will open the fibers and lay them parallel with each other without tearing the fibers. The needle-point will seldom require regrinding, as the wear upon the points while in use does not materially alter the shape.

I do not herein lay any claim to the mechanism for producing this improved tooth, nor to the method or mode of operation employed, but reserve the right to secure the same by a future application.

I claim as my invention—

In card-clothing, the wire teeth having the backs convex and tapering to a point, as set forth.

In testimony whereof I have hereunto set my hand this 15th day of December, 1880, in the presence of two subscribing witnesses.

GEORGE ETTY.

Witnesses:
 CARL KNOOP,
 WILHELM WIESENHÜTTER.